United States Patent

Füchsle et al.

[11] Patent Number: 5,841,087
[45] Date of Patent: Nov. 24, 1998

[54] ISOLATING SWITCH

[75] Inventors: Dieter Füchsle, Lengnau; Markus Zbinden, Dübendorf, both of Switzerland

[73] Assignee: Asea Brown Boveri AG, Baden, Switzerland

[21] Appl. No.: 821,928

[22] Filed: Mar. 21, 1997

[30]  Foreign Application Priority Data

Apr. 22, 1996 [DE] Germany ................. 196 15 912.1

[51] Int. Cl.⁶ .......................... H01H 33/42; H01H 33/70
[52] U.S. Cl. ........................... 218/45; 218/78; 218/84; 218/55
[58] Field of Search ........................ 218/43, 45, 55, 218/70, 71, 75, 78, 79, 80, 82, 84, 143, 153, 154; 200/48 R

[56]  References Cited

U.S. PATENT DOCUMENTS

| 3,794,799 | 2/1974 | Spindle et al. ................. 218/78 X |
| 3,886,336 | 5/1975 | Boersma et al. ................ 218/79 X |
| 4,109,124 | 8/1978 | Boersma et al. ................ 218/78 |
| 4,211,902 | 7/1980 | Tsuchida ..................... 218/45 X |
| 4,379,957 | 4/1983 | Calvino ...................... 218/45 X |
| 4,429,199 | 1/1984 | Pircher et al. ................ 218/55 X |
| 4,433,220 | 2/1984 | Buhler et al. ................. 218/143 |
| 5,484,972 | 1/1996 | Tecchio ...................... 218/70 |

FOREIGN PATENT DOCUMENTS

| 2615124 | 6/1978 | Germany ................... H01H 33/00 |
| 2718436 | 7/1979 | Germany ................... H01H 3/32 |

Primary Examiner—J. R. Scott
Attorney, Agent, or Firm—Burns, Doane, Swecker & Mathis, L.L.P.

[57]  ABSTRACT

The isolating switch (1) contains an isolating switch housing (2) and at least two switching points (18, 19, 20) which are arranged in the isolating switch housing (2), are of axially symmetrical design, and each have one fixed switching element (7, 8, 9) and one switching element (15, 16, 17) which can move along the switching point axis (21, 22, 23). A drive shaft (11) leads into the isolating switch housing (2). From this drive shaft (11), power is transmitted via a gearbox (25) to the movable switching element (15, 16, 17). The gearbox (25) has for each switching point (18, 19, 20) a control cam (26, 27, 28) which is fixedly connected to the movable switching element (15, 16, 17), is aligned transversely with respect to the shaft axis (11) and is displaceable. It also contains a lever (29, . . . 34; 47) which is attached to the drive shaft (11) and interacts with the control cam (26, 27, 28). This lever is frictionally coupled to the control cam (26, 27, 28) in such a way that in each angular position of the drive shaft (11) the control cam (26, 27, 28), and the movable switching element (15, 16, 17) which is attached thereto are positioned in a defined fashion in the direction of the switching point axis (21, 22, 23). The isolation switch compact design permits precise control of the switching points.

14 Claims, 5 Drawing Sheets

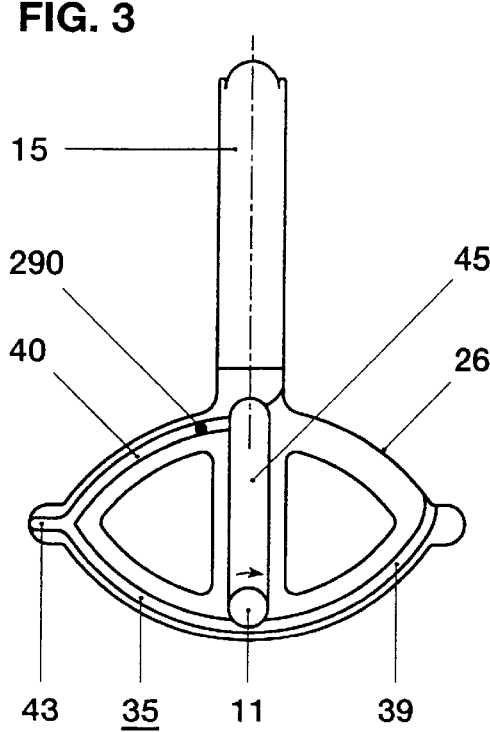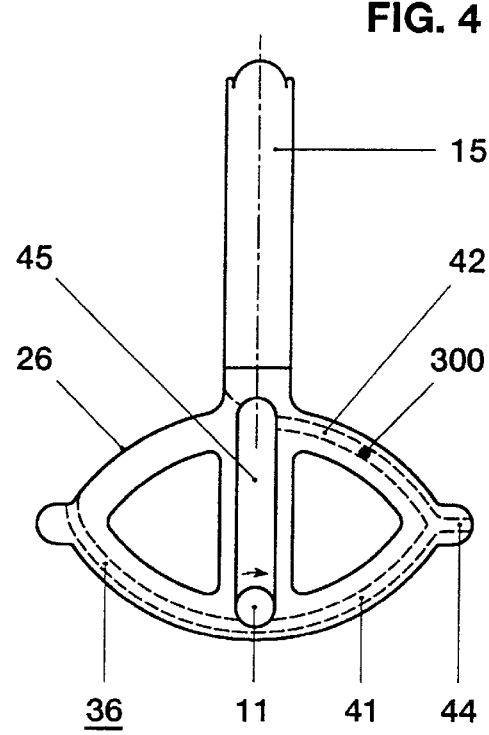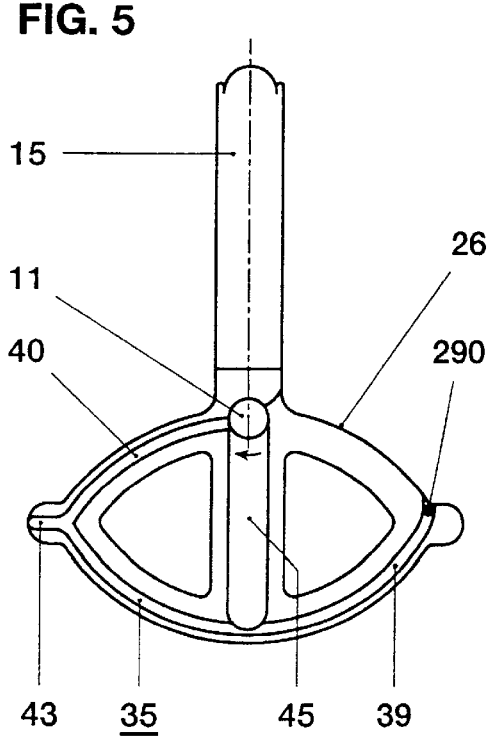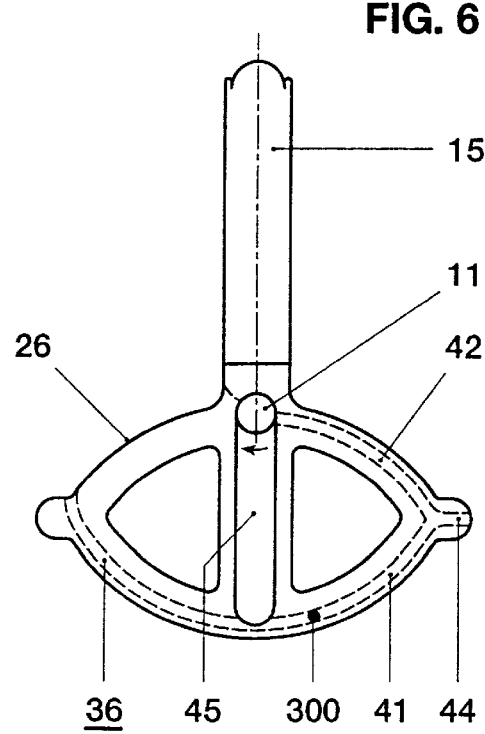

ately tubular design, of a first embodiment of the isolating switch accord-
ISOLATING SWITCH

BACKGROUND OF THE INVENTION

1. Field of the Invention

The invention is based on an isolating switch Such an isolating switch is advantageously used as a multiple isolator and a metal encapsulated, gas insulated switchgear unit and, depending on requirements, can produce connections between two of a plurality of any desired system components or disconnect these connections, such as for example between a power circuit breaker and any two busbars, between the two busbars or between the power circuit breaker and a grounding contact.

2. Discussion of Background

The invention refers to a prior art of switching devices such as is described in the older German-Patent Application, File No. P 195 11 168.0, submitted on Mar. 28, 1995. An isolating switch described in this patent application has a grounded isolator housing, which is filled with an insulating gas, and two switching points which are arranged in the isolator housing, are of axially symmetrical design and each have one fixed switching element and one switching element which can move along the switching point axis, as well as a drive shaft leading into the isolator housing and a gearbox which can transmit power from the drive shaft to the movable switching element. The gearbox contains a crank arm which is turned by the drive shaft and to which two coupling rods are coupled. The ends of the coupling rods facing away from the coupling points act on movable contacts of the switching points which are displaceably guided in the direction of the switching point axis. By suitably dimensioning the individual parts of the gearbox, such as for example the length and the angular positions of the coupling rods, the opening and closing of the two switching points can be controlled in accordance with pre-scribed switching behavior requirements of the system.

BRIEF SUMMARY OF THE INVENTION

Accordingly, one object of the invention, is to provide a novel isolating switch of the type mentioned at the beginning, which is distinguished by a compact design and at the same time easily permits an extremely precise control of the individual switching points.

The isolating switch according to the invention is distinguished in that it is of extremely space saving design. This is due, on the one hand, to the fact that its gearbox which acts between the drive shaft and movable switching elements converts drive power supplied by the drive shaft directly into forces which act in the direction of the switching points axes and, on the other hand, to the fact that coupling rods between the drive shaft and the movable switching elements are dispensed within the gearbox. The gearbox merely contains control cams which are integrated into the movable switching elements and levers which are attached to the drive shaft. Such control cams take up little space and are at the same time fitted, in a space saving manner, with a guide cam or two guide cams which pass on the power emitted by the levers to the associated movable switching element as a function of the angular position of the drive shaft in a controlled fashion. Since such a guide cam or guide cams can be matched accurately to the desired movement sequences of the movable switching element, complicated movement sequences can also be realized in this way with simple means. In addition, virtually any desired number of switching points—of one or more phases—can be actuated with a single drive shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a plan view of a control cam, provided in the isolating switch according to FIG. 1, with the switching point closed, FIG. 4 shows a plan view of the control cam according to FIG. 3, in which all the parts on the front of the control cam are removed and all the parts provided on the rear of the control cam are represented by broken lines, FIG. 5 shows a plan view of the control cam according to FIG. 3 with the switching point opened, FIG. 6 shows a plan view of the control cam, represented in accordance with FIG. 4, with the switching point opened.

DESCRIPTION OF THE PREFERRED EMBODIMENTS

Figure 1:
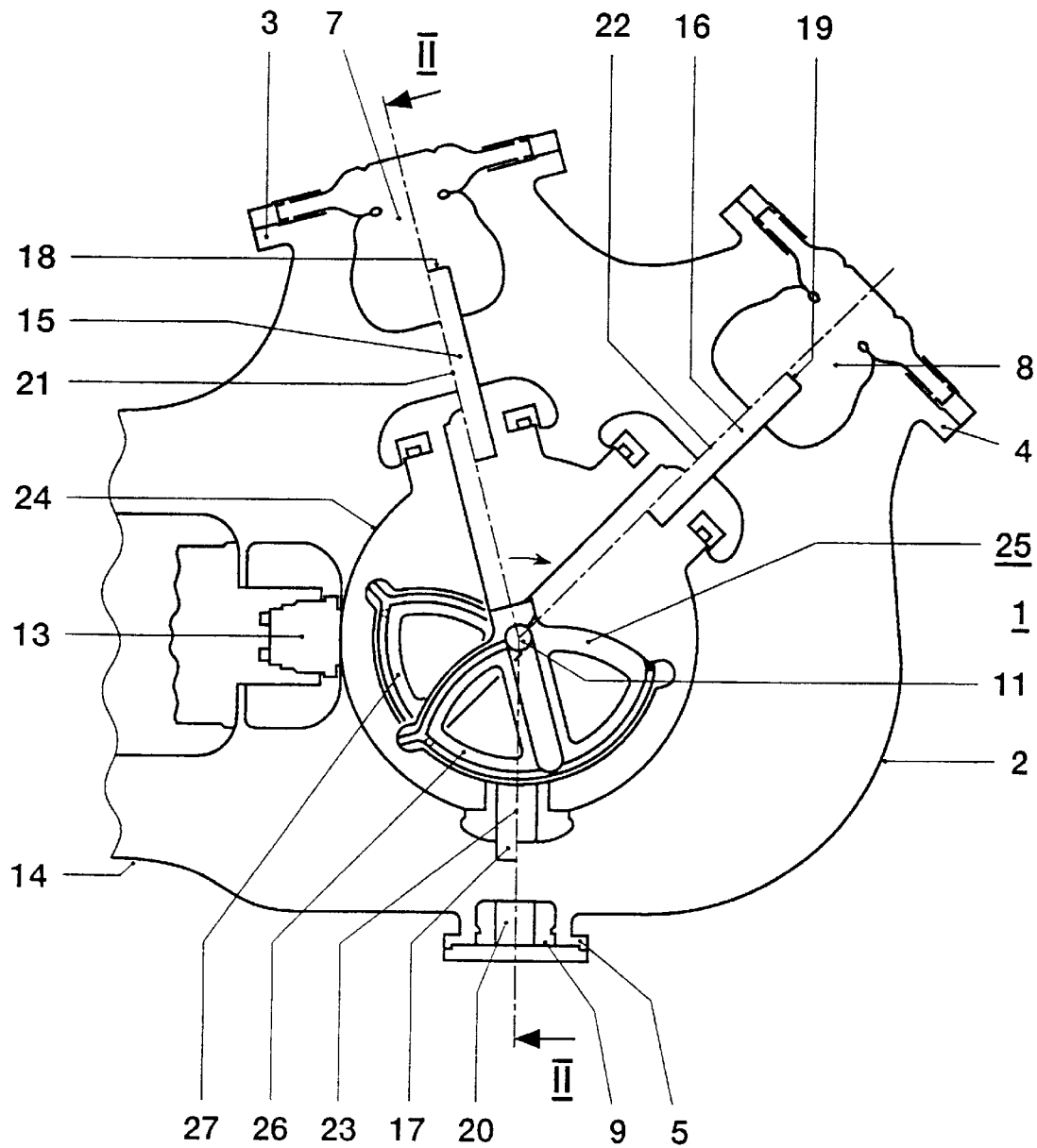
FIG. 1 shows a plan view of a section, leading predominantly transversely with respect to the tube axis along a line I—I (FIG. 2), through a housing, of essentially tubular design, of a first embodiment of the isolating switch according to the invention.
Figure 2:
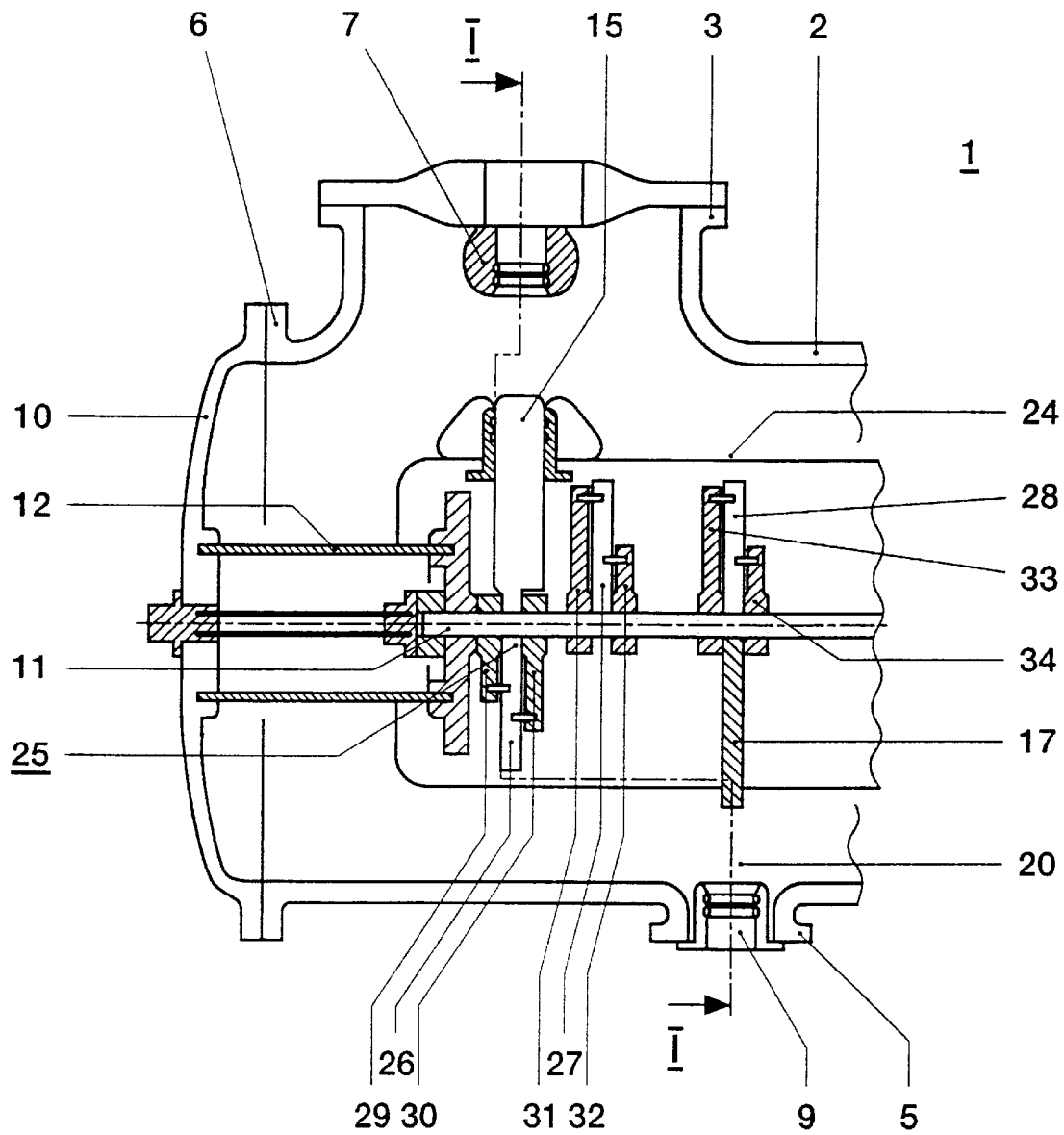
Fig. 2 shows a plan view of a section, leading axially along a line II—II, through the isolating switch according to FIG. 1.

Referring now to the drawings, wherein like reference numerals designate identical or corresponding parts throughout the several views, the isolating switch, which is illustrated in FIGS. 1 and 2 and labeled with the reference symbol 1, has a metal housing 2, which is filled with insulating gas, such as for example $SF_6$ at several bar pressure, and is of essentially tubular design. The isolating switch housing 2 is at ground potential and has on its outer surface four openings which are each bounded by one of four tubular flange projections 3, 4, 5 and 6. A fixed switching element 7 or 8, which is electrically insulated in relation to the isolating switch housing 2, is supported on the flange projection 3 or 4 with the aid of an isolator (not designated). On the other hand, the flange projection 5 is fitted with a fixed switching element 9 which is connected to the isolating switch housing 2 in an electrically conductive fashion. The flange projection 6 is fitted with a metal mounting cover 10 through which a drive shaft 11 leads into the interior of the isolating switch housing 2 in a gastight fashion. The drive shaft 11 runs in a hollow insulator 12 which is attached to the mounting cover 10. The fifth opening (not designated) of the isolating switch housing 2 is bounded by a flange projection 14 which is fitted with a current terminal 13 in an electrically insulating fashion.

The reference symbols 15, 16 and 17 designate movable switching elements of essentially pin shaped design. The movable switching element 15 and the fixed switching element 7 form a switching point 18, the movable switching element 16 and the fixed switching element 8 form a switching point 19 and the movable switching element 17 and the fixed switching element 9 form a switching point 20. The three switching points 18, 19 and 20 are of essentially axially symmetrical design. The movable switching elements 15, 16 and 17 are displaceably fastened along the respectively assigned switching point axes, 21, 22 and 23. The movable switching elements 15, 16 and 17 are electrically conductively connected to the current terminal 13 via sliding contacts (FIG. 2), which are not designated, and a shielding element 24. The switching point axes 21 and 22 are perpendicular to the axis of the drive shaft 11 and are inclined with respect to one another by an angle of typically 45° to 180°. A busbar can be connected to the fixed switching element 7 or 8 in an electrically conductive fashion. The switching points 18 and 19 then each act as a bus selector switch-disconnecter. Since the fixed switching element 9 is grounded, the switching point 23 acts as a grounding switch. The current terminal 13 is generally connected to the busbar-side outgoing circuit of a power circuit breaker.

Alternatively, the two switching points 18 and 19 can also be arranged in an outgoing feeder.

A gearbox 25 is used to transmit power from the drive shaft 11 to the movable switching element 15, 16 and 17. The gearbox 25 has, for each of the switching points 18, 19 and 20, a control cam 26, 27, 28, which is permanently connected to the assigned movable switching element 15, 16, 17, is aligned transversely with respect to the axis of the drive shaft 11 and is displaceable, as well as at least two levers 29, 30 or 31, 32 or 33, 34 which are offset axially with respect to one another, are attached to the drive shaft 11 and interact with the control cam 26 or 27 or 28. When the drive shaft 11 turns in a clockwise sense, the levers 29, 31, 33 are frictionally coupled to the control cams 26, 27, 28, for switching-on purposes, and the levers 30, 32, 34 are frictionally coupled thereto for switching off purposes, and when the drive shaft 11 turns in a counter-clockwise sense the levers 30, 32, 34 are frictionally coupled to the control cams 26, 27, 28 for switching-on purposes and the levers 29, 31, 33 are frictionally coupled thereto for switching-off purposes.

The design of a typical control cam for example the control cam 26 is shown in FIGS. 3 to 6. The control cam has a guide cam 35 on the front and a guide cam 36, arranged mirror-inverted with respect thereto, on the rear. As the drive shaft 11 turns, the guide cam 35 receives a guide part 290 attached to the lever 29, and the guide cam 36 receives a guide part 300 attached to the lever 30. Each guide cam 35 or 36 has in each case one section 39 or 41 and one section 40 or 42 adjoining this section, as well as a stop point 43 or 44 provided between the two sections 39 and 41 or 40 and 42. In addition, the control cam has an elongated hole 45 which is extended in the direction of the switching point axis 21. The drive shaft runs through this elongated hole and guides the control cam 26 in the direction of the switching point axis 21. When the switching point 18 is closed, the elongated hole 45 abuts the drive shaft 11 with its lower end (FIGS. 3 and 4) and when the switching point is opened it abuts the drive shaft 11 with its opposite, upper end (FIGS. 5 and 6).

The method of operation of this isolating switch is as follows: in the switching-on state of the switching point 18 (FIGS. 3 and 4), the movable switching element 15 is in contact with the fixed switching element 7. The control cam 26 which is fixedly connected to the movable switching element 15 leads upward and abuts the drive shaft 11 with the lower end of the elongated hole 45. The guide part 290, which is attached to the lever 29, is in contact with the section 40 and thus ensures that, when the drive shaft 11 is stationary, the control cam 26, and thus also the movable switching element 15, are fixed. At the same time, the guide part 300 which is attached to the lever 30 is in contact with the section 32 and thus additionally fixes the movable switching element 15.

In order to open the switching point 18, the drive shaft 11 is turned in a clockwise sense (cf. also FIG. 1). The guide parts 290 and 300 are initially guided here along the cam sections 40 and 42. These sections are essentially designed as arcs. The center of the assigned circles is located on the axis of the drive shaft 11. As long as the guide part 290 is guided in the section 40, the control cam 26, and thus also the movable switching element 15, remain unchanged. After the time which is prescribed by the remaining arc length of the section 40, the guide part 290 leaves the section 40. Then, the guide part 300 runs up against the stop point 44, and the control cam 26 and the movable switching element 15 are now displaced downward until the drive shaft 11 arrives at the upper end of the elongated hole 45 (FIGS. 5 and 6). The switching point 18 is then opened. By further turning of the drive shaft 11 in a clockwise sense, the guide part 300 is moved in the section 41 which is also designed as an arc, and the guide part 290 now makes contact with the section 39, also designed as an arc, of the guide cam 35. The movable switching element 15 is thus fixed in the switching-off position.

When the drive shaft is turned further in a clockwise sense, the guide parts 290 and 300 are guided along the sections 39 and 41. The control cam 26, and thus also the movable switching element 15 remain stationary. In the course of this further rotational movement of the drive shaft 11, switching point changes can be performed at the other switching points 19, 20 when the switching element 15 is stationary.

When the shaft 11 is turned further in a clockwise sense, the guide part 300 leaves the guide cam 36 and then the guide part 290 abuts the stop point 43. The control cam 26, and thus also the movable switching element 15, are now guided upward again into the switching-on position. In the switching-on position, the control cam 26, and the movable switching element 15, are then fixed in that the guide part 290 makes contact with the section 40 which is of arcuate design and the guide part 300 makes contact with the section 42 which is of arcuate design (FIGS. 3 and 4).

Alternatively, the drive shaft 11 can also be activated in a counter-clockwise sense. The guide part 300 then abuts the stop point 44 from below and then guides the control cam 26, and thus also the movable switching element 15, from the switching-off position into the switching-on position. In a corresponding fashion, the guide part 290 then abuts the stop point 43 from above and then guides the control cam 26, and thus also the movable switching element 15, from the switching-on position into the switching-off position.

A particularly small overall depth in the axial direction is achieved if the guide cams 35, 36 are each formed as a groove in the control cam. The guide parts 290, 300 can then be designed as cams which engage in the grooves.

The two guide cams 35, 36 are arranged on opposite sides of the control cam 26. However, they can also each be arranged on one of two control cams connected to the movable switching element 15. In this case, just one lever which is arranged between these two control cams and contains the two guide parts 290, 300 is required.

Figure 7:
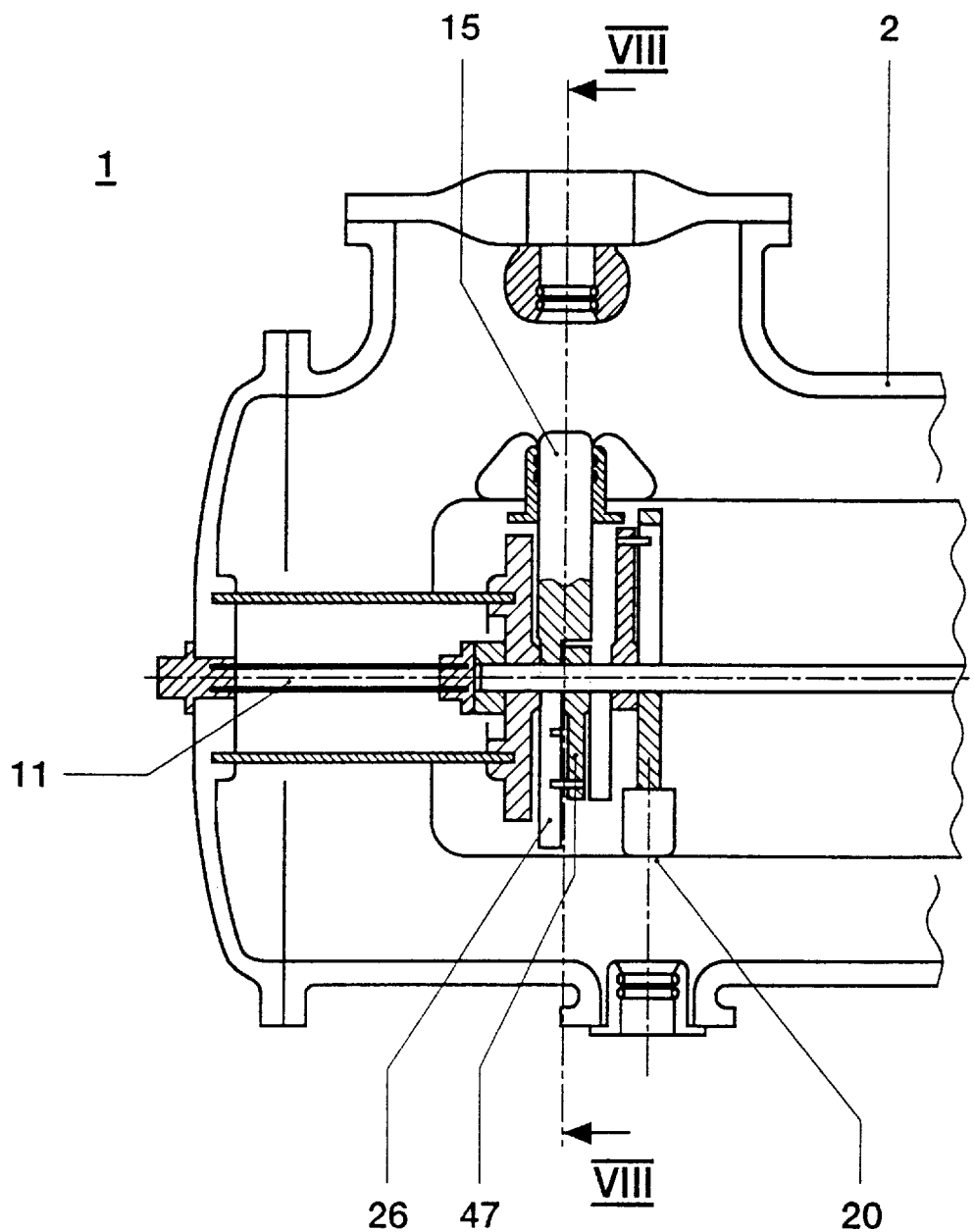
FIG. 7 shows a plan view of a section, leading axially along a line VII—VII (FIG. 8), through a housing, of essentially tubular design, of a second embodiment of the isolating switch according to the invention.
Figure 8:
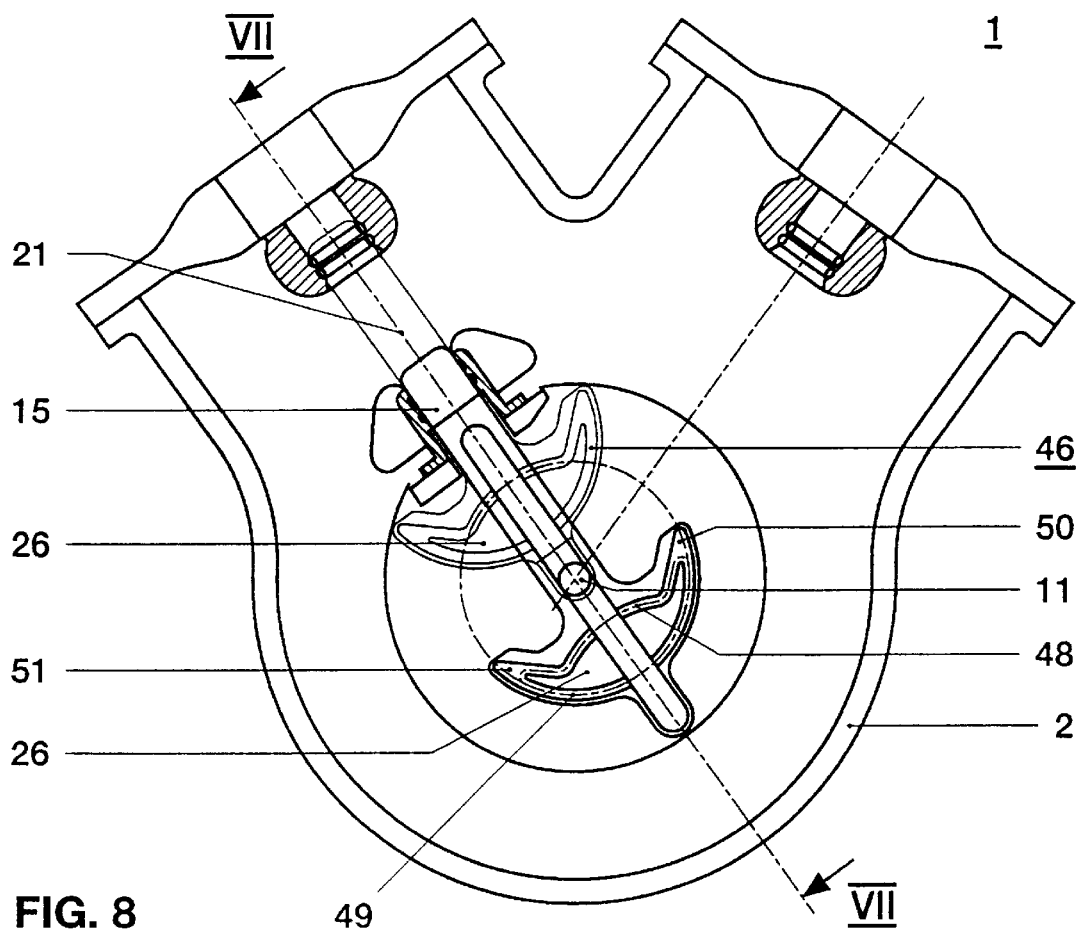
FIG. 8 shows a plan view of a section, leading essentially transversely with respect to the tube axis along the line VIII—VIII, through the isolating switch according to FIG. 7.
Figure 9:
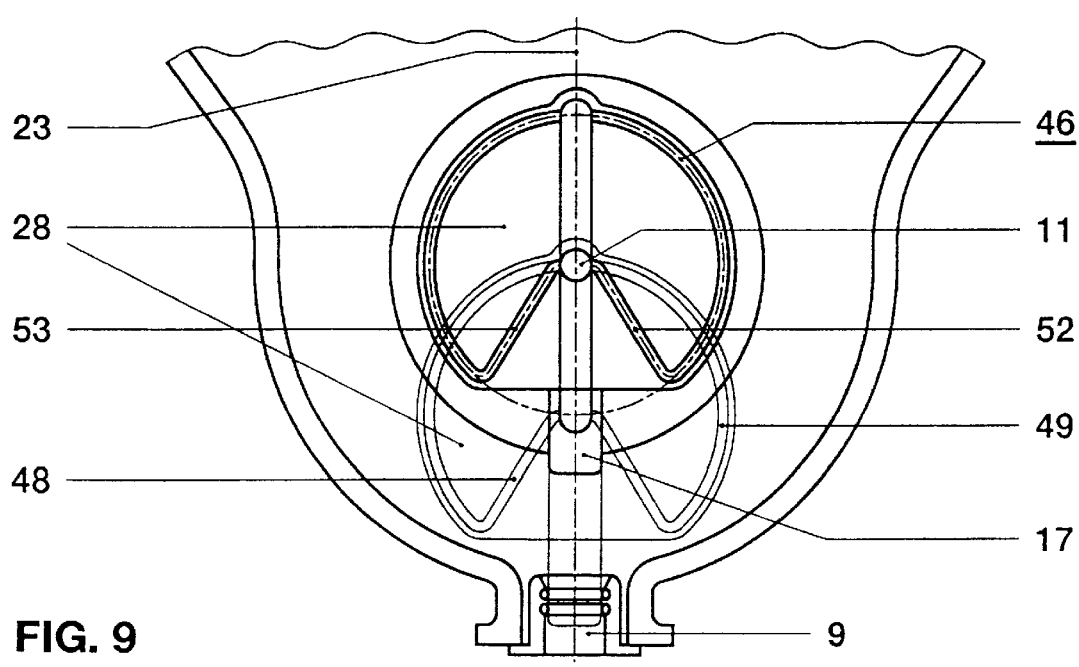
FIG. 9 shows a plan view of a section, leading transversely with respect to the tube axis, through a housing, of essentially tubular design, of a third embodiment of the isolating switch according to the invention.

In the embodiments according to FIGS. 7 to 9, the guide cams are integrated in a single guide cam 46. One control cam 26, 28 and one lever 47, attached to the drive shaft 11, are then sufficient to achieve the desired movement sequence of the movable switching element 15, 17.

In the embodiment according to FIG. 8, the guide cam 46 has two sections 48, 49 which are of arcuate design, as well as two stop points 50, 51 which are arranged between these two sections. The stop points are designed as curve sections arranged obliquely with respect to the switching point axis 21. With such a guide curve, it is possible to realize for the movable switching element 15 movement sequences such as are typical of a bus selector switch-disconnecter provided in a double busbar system.

Depending on requirements, the guide cam 46 can be designed and modified in different ways to the movement sequence of the movable switching element. If the movable switching element is part of a grounding switch, it is suitable to use the embodiment of the guide cam 46 shown in FIG. 9. In this guide cam, the section 49 which is of arcuate design comprises an angular region of approximately 270° and merges at its two ends with the cam sections 52 and 53 which are aligned in an essentially radial direction and are arranged obliquely with respect to the switching point axis 23. The cam sections 52, 53 act as stops and displace the control cam 28, and thus the movable switching element 17, in the switching-on or switching-off direction. In the short section 48, which is provided between the ends of the two sections 52 and 53 and is of arcuate design, of the guide cam 46, the control cam 28, and thus also the movable switching element 17, are held in the switching-on position.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An isolating switch comprising:

an isolating switch housing, at least two switching points arranged in the isolating switch housing, said at least two switching points having an axially symmetrical design and each of said at least two switching points including one fixed switching element and one switching element which can move along a switching point axis, a drive shaft leading into the isolating switch housing; and a gearbox which transmits power from the drive shaft to the movable switching element, said gearbox including, for each of the switching points, at least one control cam fixedly connected to the movable switching element and at least one lever attached to the drive shaft for interacting with said at least one control cam, said at least one control cam being aligned transversely with respect to the shaft axis and said at least one control cam being displaceable;

wherein the at least one control cam includes an elongated hole extending in a direction of the switching point axis, the drive shaft passing through said elongated hole.

2. The isolating switch as claimed in claim 1, wherein the at least one lever is frictionally coupled to the at least one control cam in such a way that, in each angular position of the drive shaft, the at least one control cam and the movable switching element attached thereto are positioned in the direction of the switching point axis.

3. The isolating switch as claimed in claim 1, wherein the at least one control cam includes a guide cam which, as the drive shaft turns, receives a guide part attached to the lever.

4. The isolating switch as claimed in claim 3, wherein the guide cam has two sections of arcuate design and two stop points arranged between said two sections.

5. The isolating switch as claimed in claim 4, wherein the stop points are cam sections arranged obliquely with respect to the switching point axis.

6. The isolating switch as claimed in claim 1, wherein said at least one lever includes two levers which interact with the at least one control cam and which are attached to the drive shaft, a first of said two levers is frictionally coupled to the at least one control cam in the case of switching on, and a second of said two levers is frictionally coupled thereto in the case of switching off, as the drive shaft turns in a clockwise sense, and the second of said two levers is frictionally connected to the at least one control cam in the case of switching on, and the first of said two levers is frictionally connected thereto in the case of switching off, as the drive shaft turns in a counter-clockwise sense.

7. The isolating switch as claimed in claim 6, wherein the at least one control cam has a first and a second guide cam, as the drive shaft turns, the first guide cam receives a guide part which is attached to the first lever and a second guide cam receives a guide part which is attached to the second lever.

8. The isolating switch as claimed in claim 7, wherein each of the guide cams has two sections which are essentially of arcuate design and a stop point which is provided between said two sections.

9. The isolating switch as claimed in claim 7, wherein the two guide cams are arranged on opposite sides of the at least one control cam.

10. The isolating switch as claimed in claim 7, wherein said at least one control cam includes two control cams, the two guide cams each arranged on one of the two control cams, and wherein a lever which contains the two guide parts is arranged between the two control cams.

11. The isolating switch as claimed in claim 7, wherein the two guide cams are each formed as a groove in the at least one control cam.

12. The isolating switch as claimed in claim 7, wherein the levers are axially offset with respect to one another in a direction of an axis of the drive shaft.

13. The isolating switch as claimed in claim 7, wherein the at least two switching points are connected in an electrically conductive fashion in each case to a busbar or an outgoing feeder.

14. The isolating switch as claimed in claim 13, wherein a fixed switching element of a third switching point is connected to the isolating switch housing in an electrically conductive fashion.

\* \* \* \* \*